(12) United States Patent
Kumar et al.

(10) Patent No.: US 8,977,586 B2
(45) Date of Patent: Mar. 10, 2015

(54) SYSTEM AND METHOD FOR PRIORITIZING RESUMES BASED ON A JOB DESCRIPTION

(71) Applicant: FORMCEPT Technologies and Solutions P Ltd., Bangalore (IN)

(72) Inventors: Anuj Kumar, Bangalore (IN); Suresh Srinivasan, Bangalore (IN)

(73) Assignee: FORMCEPT Technologies and Solutions Pvt Ltd, Banglore (IN)

( * ) Notice: Subject to any disclaimer, the term of this patent is extended or adjusted under 35 U.S.C. 154(b) by 268 days.

(21) Appl. No.: 13/753,548

(22) Filed: Jan. 30, 2013

(65) Prior Publication Data

US 2013/0198126 A1   Aug. 1, 2013

(30) Foreign Application Priority Data

Jan. 30, 2012   (IN) .............................. 350/CHE/2012

(51) Int. Cl.
*G06N 5/02* (2006.01)
*G06F 17/30* (2006.01)
*G06F 17/24* (2006.01)
*G06F 17/27* (2006.01)
*G06N 5/00* (2006.01)

(52) U.S. Cl.
CPC .. *G06N 5/02* (2013.01); *G06N 5/00* (2013.01); *G06F 17/30424* (2013.01); *G06F 17/245* (2013.01); *G06F 17/2765* (2013.01)

USPC .............................................. 706/46; 706/45

(58) Field of Classification Search
None
See application file for complete search history.

(56) References Cited

PUBLICATIONS

Mamoulis, et al., A Fair Assignment Algorithm for Multiple Preference Queries, VLDB '09, Aug. 2009, pp. 1-12.*

* cited by examiner

*Primary Examiner* — Wibert L Starks
(74) *Attorney, Agent, or Firm* — The Law Office of Austin Bonderer, PC; Austin Bonderer

(57) ABSTRACT

A method for prioritizing one or more of resumes based on a job description is provided. The method includes (i) processing the job description to extract one or more keywords and a first period, (ii) extracting, from a first resume and a second resume of the one or more resumes, one or more section, one or more events, a first date range, and a second date range, (iii) obtaining a second period and a third period, (iv) comparing, is the first resume and the second resume, the one or more keywords with the one or more events and the first period with the third period to obtain a relevant event and a relevant section, (v) computing a first weight for the first resume and a second weight for the second resume, and (vi) prioritizing the first resume and the second resume based on the first weight and the second weight.

15 Claims, 13 Drawing Sheets

Education ~504
PhD at MIT Media Lab, Massachusetts Institute of Technology
2008 to current; Massachusetts Institute of Technology; CPA 5.0/5.0
Master of Science at MIT Media Lab, Massachusetts Institute of Technology
2006 to current; Media Arts and Sciences; Massachusetts Institute of Technology; CPA 4.9/5.0
Master of Design at IDC, IIT Bombay
2003 to 2005; Industrial Design Centre, Indian Institute of Technology, Bombay; CPA 4.9/5.0
Bachelor of Computer Engineering at Gujarat University
1999 to 2003; Nirma Institute of Technology; Gujarat University; CPA 4.7/5.0

Working Experience ~506
Research Assistant at Fluid Interfaces, MIT Media Lab
2008 to current, Fluid Interfaces Group, MIT Media Lab.
Visiting Researcher at Japan Science and Technology Agency
winter 2009, JST ERATO IGARASHI Design Interface Project, Tokyo.
Researcher at Microsoft Research
summer internship (summer 2009) with Adaptive Systems and Interaction, MSR.
Research Assistant at Ambient Intelligence, MIT Media Lab
2006 to 2008, Ambient Intelligence Group, MIT Media Lab.

Resume
Education ~804
Certificate IV Agriculture at ABC University ~806
2002 to 2006; X Institute of Technology; ABC University; CPA 4.7/5.0

Working Experience – 6 years ~808
2006 to 2008, 2 years in Company A ~810
Consulting in Java coffee and agriculture, including field techniques, processing and marketing; based in Molokai, Hawaii.

2008 to 2012, 4 years in Company B ~812
Refurbishing dilapidated coffee orchard

Education ~816
Bachelor of Engineering in Tropical & Subtropical Agriculture at XYZ University
2002 to 2006; Y Institute of Technology; XYZ University; CPA 3.5/5.0 ~818

Working Experience – 5 years ~820
2007 to 2009, 2 years in Company X ~822
Coffee plantation 2009 to 2012, 3 years in Company Y ~823
Tea plantation

FIG. 8B

Education — 826
Bachelor of Science Degree, General Tropical Agriculture at XYZ University
2000 to 2004; Y Institute of Technology; XYZ University; CPA 4.0/5.0 — 828

Working Experience – 8 years — 830
2004 to 2010, 6 years in Company B
Combining estate coffee growing and processing and marketing into a successfully branded product line — 832

2010 to 2012, 2 years in Company C
Milk Production — 834

SYSTEM AND METHOD FOR PRIORITIZING RESUMES BASED ON A JOB DESCRIPTION

CROSS-REFERENCE TO RELATED APPLICATIONS

This application claims priority to Indian patent application no. 350/CHE/2012 filed on Jan. 30, 2012, the complete disclosure of which, in its entirety, is herein incorporated by reference.

BACKGROUND

1. Technical Field

The embodiment herein generally relate to prioritizing resumes, and more particularly to the system and method for prioritizing one or more resumes based on a job description.

2. Description of the Related Art

Recruitment is a process of attracting, screening and selecting a qualified person for a job. Irrespective of an organization size, all organizations need the right candidates who suit for their needs. The process of recruitment is not at all an easy task. It has always been a challenge for any organization due to the high number of candidate resumes coming in for a specific job description.

At present, recruiter has to manually check these candidates resume for their relevancy with respect to the job description. Thus, for preliminary screening of candidates, one has to manually check the resumes. Usually, this process is time consuming and also increases labor costs.

Further, there are many job portals that are available that provide recruiters a way for searching candidates in their database. The recruiters can search for the candidates using the keywords associated with a job. However, one or more resumes that are retrieved for the keywords are not prioritized. Hence, the recruiters have to analyze each resume and identify best resume that matches the keywords manually. Accordingly there remains for a tool/portal which analyzes and prioritizes one or more resumes based on a job description to identify one or more right candidates.

SUMMARY

In view of the foregoing, an embodiment herein provides a provides a method for prioritizing one or more of resumes based on a job description. The method includes (i) processing the job description to extract one or more keywords and a first period, (ii) extracting, from a first resume and a second resume of the one or more resumes, (a) one or more section, (b) one or more events associated with the one or more section, (c) a first date range associated with the one or more section, and (d) a second date range associated with the one or more event, (iii) obtaining (a) a second period corresponding to the one or more section in the first resume and the second resume and (b) a third period corresponding to the one or more events in the first resume and the second resume, (iv) comparing, in the first resume and the second resume, (a) the one or more keywords with the one or more events and (b) the first period with the third period to obtain a relevant event, and a relevant section that is associated with the relevant event, (v) computing a first weight for the first resume and a second weight for the second resume based on (a) the third period, (b) the second date range of the relevant event, and (c) the second period of the relevant section; and (vi) prioritizing the first resume and the second resume from the owe or more of resumes based on the first weight and the second weight. The start date and the end date may include a year, a date or a month.

The first dale range and the second date range each may include a start date and an end date. The second period may be obtained from the first date range and the third period is obtained from the second date range. The first weight and the second weight are computed in accordance with an equation:

$W=P1/(P2*(Y1-Y2))$, where W=the weight; P1=the third period, P2=the second period of the relevant section, Y1=a current year and Y2=a latest year. The latest year may be the year of the end date of the second date range associated with the relevant event. Y1 is not equal to Y2.

The method further may include (a) processing the job description to extract a fourth period; and (b) comparing, the first resume and the second resume, (i) the one or more keywords with the one or more event; (ii) the fourth period to the second period, and (iii) the first period with the third period to obtain the relevant event from the one or more events and the relevant section that is associated with the relevant event.

In another aspect, a system for prioritising one or more of resume based on the job description is provided. The system includes (a) a memory unit that stores a database and a set of modules, (b) a display unit and (c) a processor that executes the set of modules. The database stores the one or more of resumes. The set of modules includes (i) an extracting module and (ii) a comparison module, (iii) a weight computing module and (iv) a prioritizing module. The extracting module (i) extracts, from the job description, one or more keywords and a first period and (ii) extracts, from a first resume and a second resume of the one or more resumes, (a) one or more section, (b) one or more events associated with the one or more section, (c) a first date range associated with the one or more section and (d) a second date range associated with the one or more event. The comparison module compares, in the first resume and the second resume, (i) the one or more keywords with the one or more events and (ii) the first period with a third period associated with the one or more events to obtain (a) a relevant event from the one or more events and (b) a relevant section that is associated with the relevant event. The weight computing module computes a first weight for the first resume and a second weight for the second resume based on (i) the third period, (ii) the second date range of the relevant event and (iii) a second period that corresponds to the relevant section. The prioritizing module prioritizes the first resume and the second resume from the one or more of resumes based on the first weight and the second weight. The first date range and the second date range include a start date and an end date. The system may further include a period computing module that computes (i) the second period based on the first date range and (ii) the third period based on the second date range. The start date and the end date may include a year, a date or a month.

In yet another aspect, a non-transitory program, storage device readable by computer, and including a program of instructions executable by the computer to perform a method for prioritizing one or more of resumes based on a job description is provided. The method includes (i) processing the job description to extract one or more keywords and a first period, (ii) extracting, from a first resume and a second resume of the one or more resumes, (a) one or more section, (b) one or more events associated with the one or more section, (c) a first date range associated with the one or more section, and (d) a second date range associated with the one or more event (iii)

obtaining (a) a second period corresponding to the one or more section in the first resume and the second resume and (b) a third period corresponding to the one or more events in the first resume and the second resume, (iv) comparing, in the first resume and the second resume, (a) the one or more keywords with the one or more events and (b) the first period with the third period to obtain a relevant event, and a relevant section that is associated with the relevant event, (v) computing a first weight for the first resume and a second weight for the second resume based on (a) the third period, (b) the second date range of the relevant event, and (c) the second period of the relevant section, and (v) prioritizing the first resume and the second resume from the one or more of resumes based on the first weight and the second weight. The first date range and the second date range each comprise a start date and an end date. The start date and the end date may include a year, a date or a month.

The second period may be obtained based on the second range date. The third period may be obtained based on the third data range. The first weight and the second weight are calculated in accordance with an equation:

$$W=P1/(P2*(Y1-Y2)),$$

where W=the weight; P1=the third period, P2=the second period of the relevant section, Y1=current year and Y2=latest year. The latest year may be a year of the end date of the second date range associated with the relevant event and Y1 is not equal to Y2. The method may further include (a) processing the job description to extract a fourth period, and (b) comparing, the first resume and the second resume, (i) the one or more keywords with the one or more event, (ii) the fourth period to the second period, and (iii) the first period with the third period to obtain the relevant event from the one or more events and die relevant section that is associated with the relevant event.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION Of THE DRAWINGS

The embodiments herein will be better understood from the following detailed description with reference to the drawings, in which:

FIG. 5 is a user interface view of a resume of a candidate obtained from the database of the resume analysing and prioritising tool 106 of FIG. 1 according to an embodiment herein;

FIG. 8A through 8C is a user interface view of one or more resumes of one or more candidates stored in the database of the resume analyzing and prioritizing tool of FIG. 1 according to an embodiment herein.

DETAILED DESCRIPTION OP PREFERRED EMBODIMENTS

Figure 1:
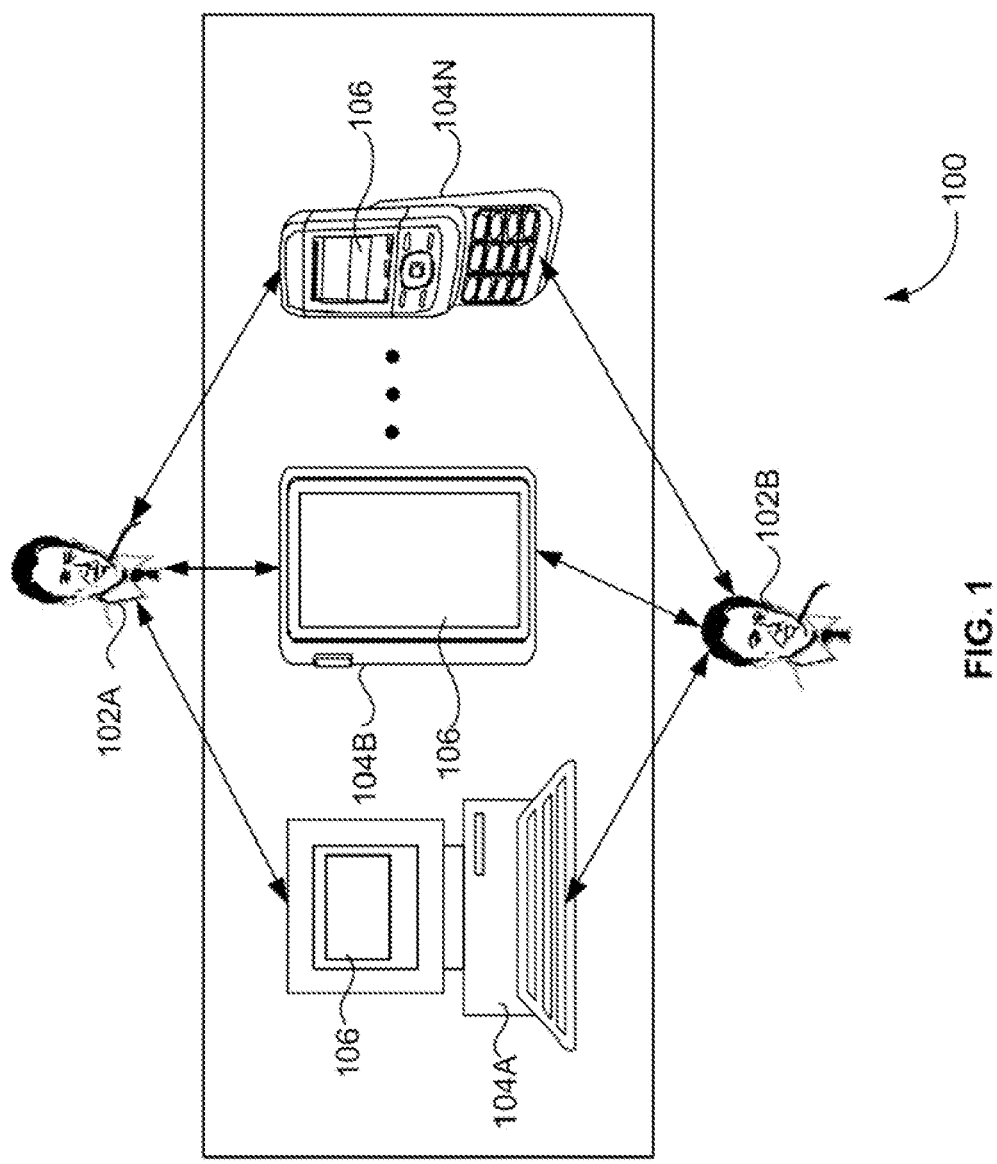
FIG. 1 illustrates a system view of users communicating with a user system for prioritizing one or more resumes using a resume analysing and prioritizing tool according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a tool/portal which analyzes and prioritizes one or more resumes based on a job description to identify one or more right candidates. The embodiments herein achieve this by providing a resume analysing and prioritizing tool that computes a weight for each of the one or more resumes using a job description. The weight is computed based on a recency factor. The resume analyzing and prioritizing tool prioritizes the one or more resumes based on the weight. Referring now to the drawings, and more particularly to FIGS. 1 through 10, where similar reference characters denote corresponding features consistently throughout the figures, there are shown preferred embodiments.

FIG. 1 illustrates a system view of users 102A-B communicating with a user system 104A-N for prioritizing one or more resumes using a resume analyzing and prioritizing tool 106 according to an embodiment herein. The user system 104A-N may be a personal computer (PC) 104A, a tablet 104B and/or a smart phone 104N. A user 102A is one or more recruiters, in one example embodiment. A user 102B is one or more candidates who would like to seek a job. The user system 104A-N includes the resume analyzing and prioritizing tool 106 that prioritizes one or more resumes for screening and selecting one or more candidates. The resume analyzing and prioritizing tool 106 receives one or more resumes from the user 102B, in one example embodiment. The resume analyzing and prioritizing tool 106 may (i) obtain the one or more resumes from one or more job portals, and/or (ii) fetch the one or more resumes from emails, etc., in another example embodiment.

Figure 2:
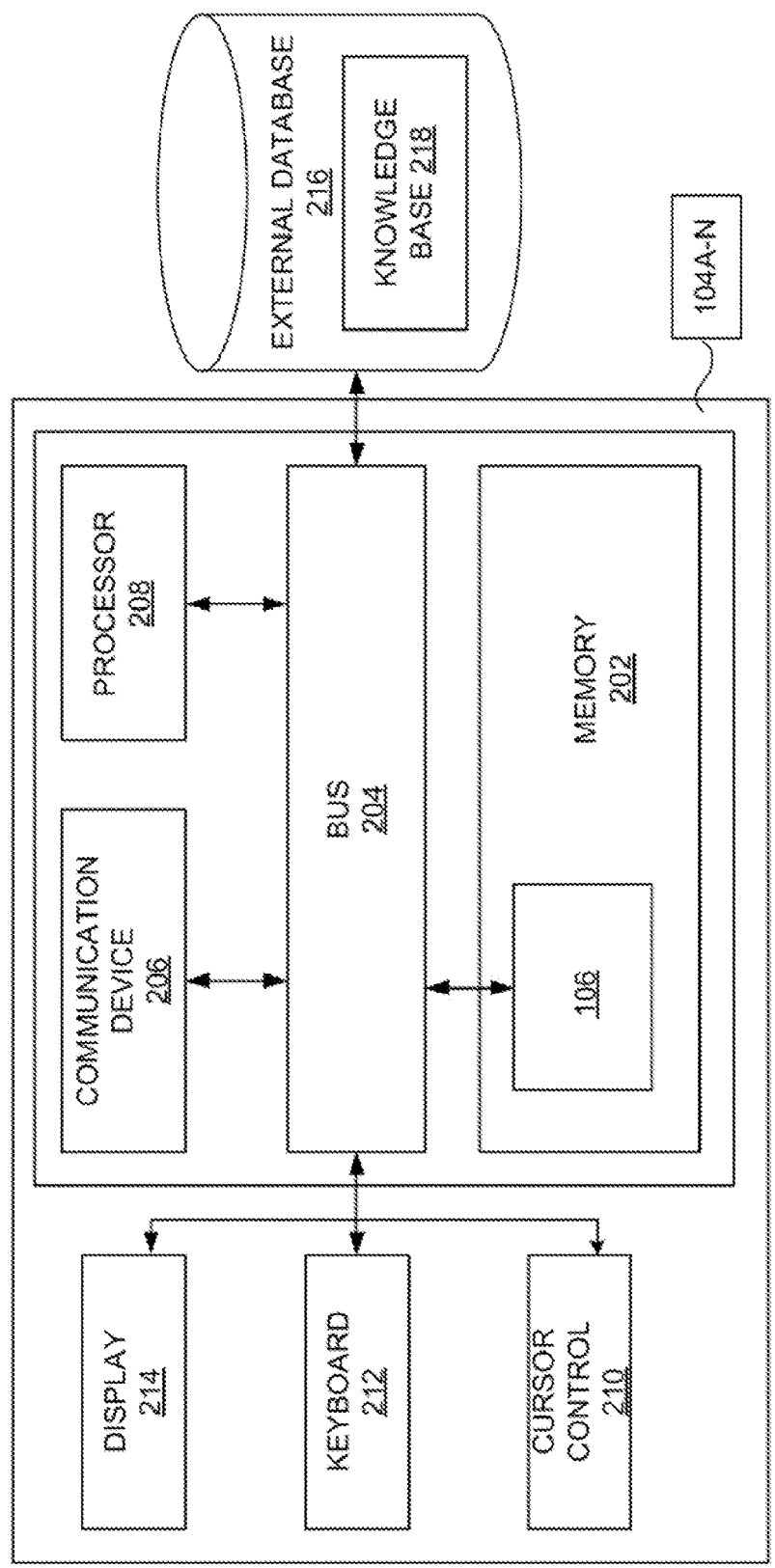
FIG. 2 illustrates an exploded view of the user system with a memory storage unit for storing the resume analyzing and prioritizing tool of FIG. 1 and an external database according to an embodiment herein.

FIG. 2 illustrates an exploded view of the user system 104A-N with a memory storage unit 202 for storing the resume analyzing and prioritizing tool 106 of FIG. 1 and an external database 216 according to an embodiment herein. The user system 104A-N includes the memory storage unit 202, a bus 204, a communication device 206, a processor 208, a cursor control 210, a keyboard 212, and a display 214. The memory storage unit 202 stores the resume analyzing and prioritizing tool 106. The resume analyzing and prioritizing tool 106 includes one or more modules to perform various functions on art input content and assists the one or more recruiters 102A in selecting a right candidate for a given job description. The external database 216 includes a knowledge base 218 that is populated with a set of categories based on one or more concepts of linked data. The set of categories correspond to various keywords.

Figure 3:
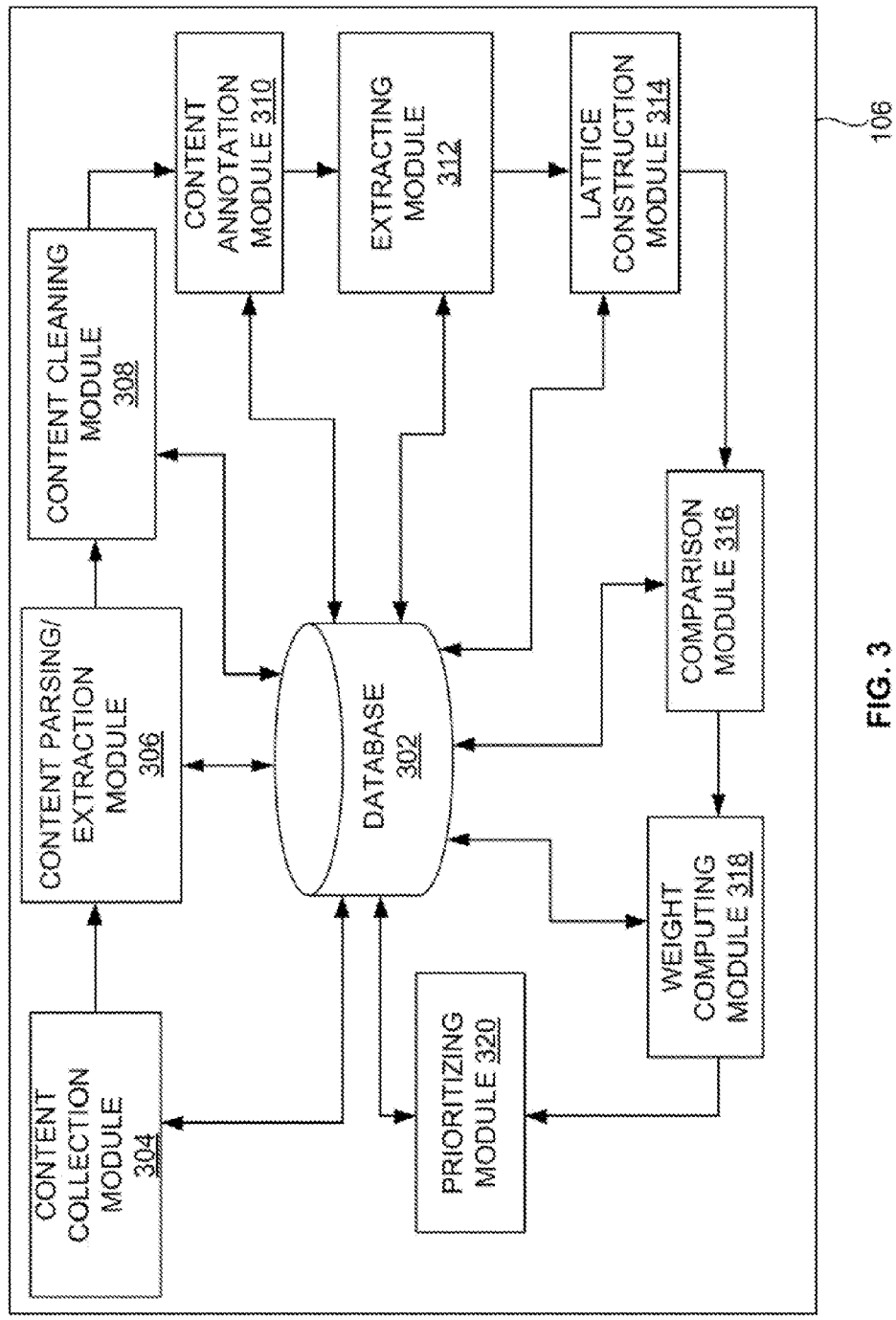
FIG. 3 is an exploded view of the resume analyzing and prioritizing tool of FIG. 1 illustrating a process of analyzing the one or more resumes according to an embodiment herein.

FIG. 3 is an exploded view of the resume analyzing and prioritizing tool 106 of FIG. 1 illustrating a process of analyzing the one or more resumes according to an embodiment herein. The resume analyzing and prioritizing tool 106 includes a database 302, a content collection module 304, a content, parsing/extraction module 306, a content, cleaning module 308, a content annotation module 310, an extracting module 312, a lattice construction module 314, a comparison module 316, a weight computing module 318, and a prioritizing module 320.

The database 302 stores one or more resumes that are identified and prioritized based on a job description (e.g., a search query). The content collection module 304 collects content or text associated with a resume. The content collection module 304 also collects content or text associated with a job description from the user 102A (e.g., the one or more recruiters). The resume may be obtained from the user 102B (one or more candidates who are interested in seeking a job), in one example embodiment. The resume may be in a.doc format, a pdf an.rtf, and/or obtained from a Uniform (or universal) resource locator (URL), etc. The content parsing/extraction module 306 extracts the content and/or text from the resume. Further, the content parsing/extraction module 306 parses an HTML content when the resume is obtained from the URL. The content cleaning module 308 cleans the content before sending it to the content annotation module 310. Cleaning may include removal of junk characters, new lines that are not useful, application specific symbols (e.g., MB Word bullets), and/or non-unicode characters etc. In one embodiment, specific parts of the document (e.g., a header and/or a footer) may be excluded.

The content annotation module 310 annotates the content of the resume and the content of the job description for useful information. The useful information may include sentences, keywords, tokens, new lines, one or more sections (e.g., objectives, a work experience, education, circular activities, and/or personal information, etc.), durations (e.g., a first date range such as 2010-2012 that is associated with the one or more sections of the resume, and a second date range 2012-2013 that is associated with the one or more events of the one or more sections), durations within the sections, sentences associated with sections, and sentences associated with duration of the resume associated with a candidate. The one or more sections may include one or more events (e.g., the candidate has 2 years of experience in Java, C and C++).

Once the annotations are done in the content annotation module 310, the extracting module 312 extracts one or more artifacts (e.g., sentences, keywords, tokens, new lines, sections such as objectives, a work experience, education, circular activities, and/or personal information, etc., durations such as one or more date ranges, durations within the sections, sentences associated with sections, and sentences associated with duration of the resume associated with the candidate. The extracting module 312 extracts a name, an email address, a phone number, and any other contact details that are mentioned in the resume. The extracting module 312 identifies and extracts one or more keywords in the job description such that at least one keyword from the one or more keywords is associated with a period. For example, a job description may include "Overall 5 years of experience m agriculture with 2 years of experience in Java coffee plantation". In the above job description, the extracting module 312 identifies and extracts (i) a period as 5 years (e.g., a first period). Similarly, the extracting module 312 identifies and extracts at least one keyword that may be (i) overall, experience, etc.

Similarly, the extracting module 312 may identify and extract (a) a second period that corresponds to at least one section in the resume and (b) a third period that corresponds to at least one event associated with the at least one section in the resume.

The lattice construction module 314 disambiguates (i) the one or more keywords from the job description, and (ii) one or more keywords in the resume to compute the context in which the keywords from the job description and the keywords from the resumes are used. The lattice construction module 314 constructs a lattice based on a weighted Formal Concept Analysis (wFCA) using (i) the keywords from the job description and (ii) the keywords from the resume as objects, and their corresponding categories as attributes.

The comparison module 316 compares (i) one or more keywords of the job description with the one or more events in the resume, and (ii) the first period of the job description with the second period and/or the third period in the resume to obtain (a) a relevant event, and (b) a relevant section that is associated with the relevant event.

The weight computing module 318 computes a weight for the resume based on (i) the first period, (ii) the second date range of at least one event (e.g., the relevant event), and (iii) the second period of the at least one section (e.g., the relevant section). Similarly, the weight computing module 318 computes weight for the remaining resumes stored in the database 302. The prioritizing module 320 prioritizes the one or more resumes based on the weight computed.

Figure 4:
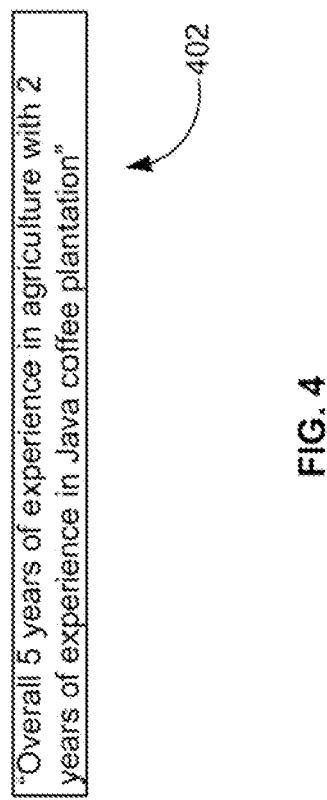
FIG. 4 is a user interface view of a job description according to an embodiment herein.

FIG. 4 is a user interlace view of a job description 402 according to an embodiment herein. The job description 402 can either be submitted on the fly or be stored in the database 302 of the resume analyzing and prioritizing tool 106. For example, the job description 402 may include the content "Overall 5 years of experience in agriculture with 2 years of experience in Java coffee plantation".

FIG. 5 is a user interface view of a resume 502 of a candidate obtained from the database 302 of the resume analysing and prioritizing tool 106 of FIG. 1 according to an embodiment hereto. The resume 502 includes a first section 504 having one or more events that includes one or more periods, a second section 506 having one or more events that includes one or more periods. The first section 504 is an education section, in one example embodiment. The one or more events that includes one or periods in the first section 504 may be as follows:

"PhD at MIT Media Lab, Massachusetts Institute of Technology 2008 to current; Massachusetts Institute of Technology; CPA 5.0/5.0

Master of Science at MIT Media Lab, Massachusetts Institute Technology 2006 to current; Media Arts and Sciences; Massachusetts Institute of Technology; CPA 4.9/5.0

Master of Design at IDC, IIT Bombay 2005 in 2005; Industrial Design Centre, Indian Institute of Technology, Bombay; CPA 4.9/5.0

Bachelor of Computer Engineering at Gujarat University 1999 to 2003; Nirma Institute of Technology; Gujarat University; CPA 4.7/5.0 Working"

Similarly, the second section 506 is a work, experience section, in one example embodiment. The one or more events that includes one or periods in the second section 506 may be as follows:

"Research Assistant at Fluid Interfaces, MIT Media Lab 2008 to current, Fluid Interfaces Group, MIT Media Lab.

Visiting Researcher at Japan Science and Technology Agency winter 2009, JST ERATO IGARASHI Design Interface Prefect, Tokyo, Researcher at Microsoft Research summer internship (summer 2009) with Adaptive Systems and Interaction, MSR, Research Assistant at Ambient Intelligence MIT Media Lab 2006 to 2008, Ambient Intelligence Group, MIT Media Lab."

Figure 6:
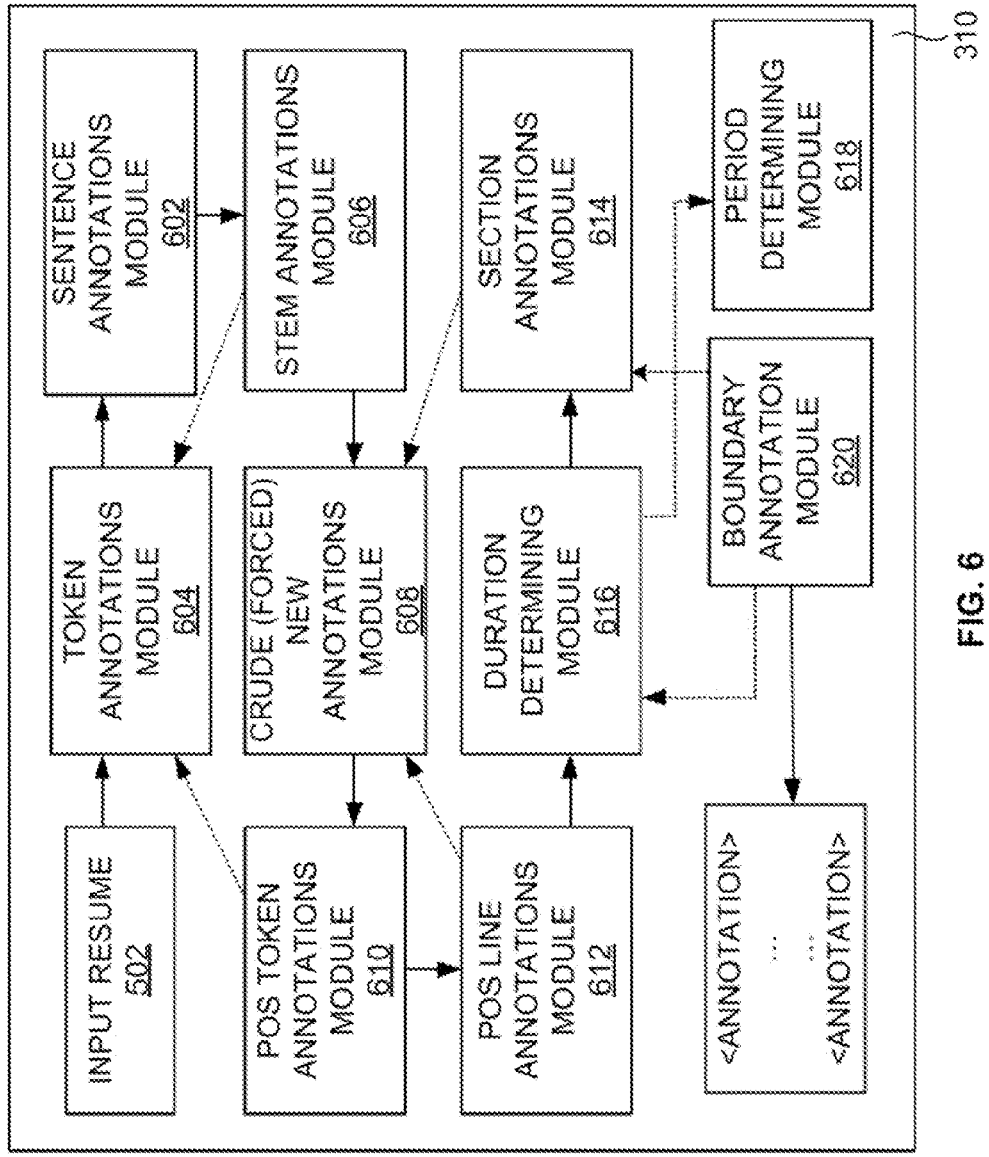
FIG. 6 illustrates an exploded view of the content annotation module of FIG. 3 of the resume analyzing and prioritizing tool of FIG. 1 according to an embodiment herein.

FIG. 6 illustrates an exploded view of the content annotation module 310 of FIG. 3 of the resume analyzing and prioritizing tool 106 of FIG. 1 according to an embodiment herein. The content annotation module 308 includes a sentence annotations module 602, a token annotations module 604, a stem annotations module 606, a forced new lines, paragraphs and indentations computing module 608, a parts of speech tag (POS) token annotations module 610, a POS line annotation module 612, a section, annotations module 614, a duration determining module 616, a period computing module 618, and a boundary annotation module 620. The dotted lines of FIG. 6 represent internal dependencies among die various modules. The solid lines represent the flow of annotation process. The sentence annotations module 602 extracts each and every sentence from the job description content 402 and the resume 502. For example, the first sentence of the resume content 502 is extracted by the sentence annotations module 602 includes.

"PhD at MIT Media Lab, Massachusetts Institute of Technology,"

Similarly, the sentence annotations module 602 extracts all the sentences horn the resume 502. After parsing and cleaning the content from the job description 402 and the resume 502, the cleaned content is annotated by performing various levels of annotations using the modules of the content annotation module 310.

The token annotations module 604 determines each and every token in the extracted sentences. For example, the tokens in the first line of the resume 502 may be "PhD", "at", "MIT", "Media", "Lab", ",", "Massachusetts", "Institute", "of", "Technology". The stem annotations module 606 computes a root word for each and every token identified by the token annotations module 604.

The forced new lines, paragraphs and indentations computing module 608 determines white spaces such as one or more new lines that are forced (e.g., an enter received, list of incorrect sentences), paragraphs, and/or indentations, etc. The POS token annotations module 610 generates one or more parts of speech (POS) tag such as a noun, and/or a verb, etc. for each token in the sentences such that each token annotation has an associated POS tag. The POS line annotations module 612 tags each token in the extracted new lines as a noun, and/or a verb, etc. New lines may be useful for section extraction because section names or titles may not be proper sentences. For example, in the resume content 502, "education" and "working experience" are not proper sentences but a word, and a fragment of two words respectively. These are captured as a new line (e.g., using the section annotations module 614) because they occur in a separate line. The section annotations module 614 determines a group of sentences that form a section that has a heading.

The duration determining module 6161 extracts one or more duration(s) wherever it occurs in the job description 402 and the resume 502. For example, the duration determining module 616 extracts duration(s), like "2008 to current", "2006 to current", from the resume etc. The period computing module 618 computes at least one period for each section and each event associated with each section of the resume 502. The period may be computed from a date range of the resume 502. For example, when a date range is 2008-current (e.g., 2013), the period is 5 years.

The boundary annotations module 620 associates related text with the duration identified by the duration determining module 616. Most often, there may be information that is associated with the duration but is not mentioned in the same line where duration occurs. The boundary annotations module 620 assigns a right boundary and a left boundary to identify exact information associated with the duration. For example, "PhD at MIT Media Lab, Massachusetts Institute of Technology 2008 to current; Massachusetts institute of Technology; CPA 5.0/5.0

Master of Science at MIT Medic Lab, Massachusetts Institute of Technology 2006 to current; Media Arts and Sciences; Massachusetts Institute of Technology; CPA 4.9/5.0

Master of Design at IDC, IIT Bombay 2003 to 2005; Industrial Design Centre, Indian Institute of Technology, Bombay; CPA 4.9/5.0

Bachelor of Computer Engineering at Gujarat University 1999 to 2003; Nirma Institute of Technology; Gujarat University; CPA 4.7/5.0 Working Experience"

In the above example, the text shown is selected from the education Section and a new section, ("working experience") of the resume 502. The duration determining module 616 determines one or more periods such as "2008 to current", "2006 to current", "2003 to 2005" and "1993 to 2003". The section annotations module 614 determines "working experience" as a new section. The boundary annotations module 620 assigns the led boundary and the right boundary for each of the identified duration. The left boundary for the duration "2008 to current" is "PhD at MIT Media Lab, Massachusetts Institute of Technology". The right boundary is Master of Science at MIT Media Lab, Massachusetts Institute of Technology. Both these lines, left and right to the duration annotations are considered as possible associations with the duration "2008 to current". Similarly, left and right boundaries are assigned for each of the duration. The right boundary for the last duration "1999 to 2003" is a new section ("working experience"). Therefore, the boundary annotations module 620 computes that right boundary for the last duration is not associated with the context of that duration. Further, the resume analyzing and prioritizing tool 106 identifies the one or more sections and the context in which the year like numbers are occurring and includes/excludes based on the context. For example, when a candidate's resume states that the person stands 1st out of 2000 people who have all attended the interview, the resume analyzing and prioritizing tool 106 identifies that 2000 is not part of the duration.

Further, the boundary annotations module 620 uses a simple heuristics to determine the best possible association for entire section. The heuristic counts the number of left and right associations for the entire section. In the above example, the numbers of left associations are compared to the number of right associations since the last duration annotation does not have any line covered by the right boundary. Since, the left associations are compared to the right associations, the boundary annotations module 620 will consider left association as the best possible association. Thus, the duration "2008 to current" is associated, with the "PhD at MIT Media Lab, Massachusetts Institute of Technology".

The user 102A may submit the job description 402 in the resume analyzing and prioritizing tool 106. Once the job description 402 is submitted, the content of the job description 402 is collected using the content collection module 304, extracted using the parsing/extraction module 306, cleaned using the content cleaning module 308, and annotated using the content annotation module 310. The annotations give the following details:

Overall experience in Agriculture: 5 years

Experience for keyword Java, coffee end plantation: 2 years

The extracting module 312 extracts the one or more keywords from the job description 402 using the POS annotations module. The extracted keywords are Java, Coffee, Plantation, Agriculture.

Once these keywords are identified and extracted, the keywords are disambiguated to determine the right meaning. To disambiguate, the resume analyzing and prioritizing tool 106 determines the different disambiguated terms for the extracted keywords and their related categories. Further, the resume analyzing and prioritizing tool 106 uses the knowledge base 218 stored in the external database 216 for obtaining categories for the extracted keywords. Each keyword is queried separately against the knowledge base 218 and corresponding categories are obtained. For example, for the above keywords, the categories obtained are I. Java I.1 Java Language—{Computers, Computing, Computing Platforms, Java Platform}

I.2 Java Coffee—{Business, Industry, Food Industry, Food Science, Food and Drink Beverages, Hot Beverages, Coffee, Coffee Varieties}

2. Coffee—{Business, Industry, Food Industry, Food Science, Food and Drink, Beverages, Hot Beverages}

3. Plantation—{Agriculture, Agricultural Establishments}

4. Agriculture—{Agriculture}

In the above example, Java coffee and Java language are the two keywords obtained from the knowledge base 216 for the keyword "Java". Thus, the keyword "Java" needs to be disambiguated for two words (java as a language and java as a coffee). In order to disambiguate the keyword "java" and to compute the context in the right meaning, the resume analyzing and prioritizing tool 106 uses the lattice construction module 314. The lattice construction module 314 constructs a lattice based on weighted Formal Concept Analysis (wFCA) using the keywords as objects and their corresponding categories as attributes.

Figure 7:
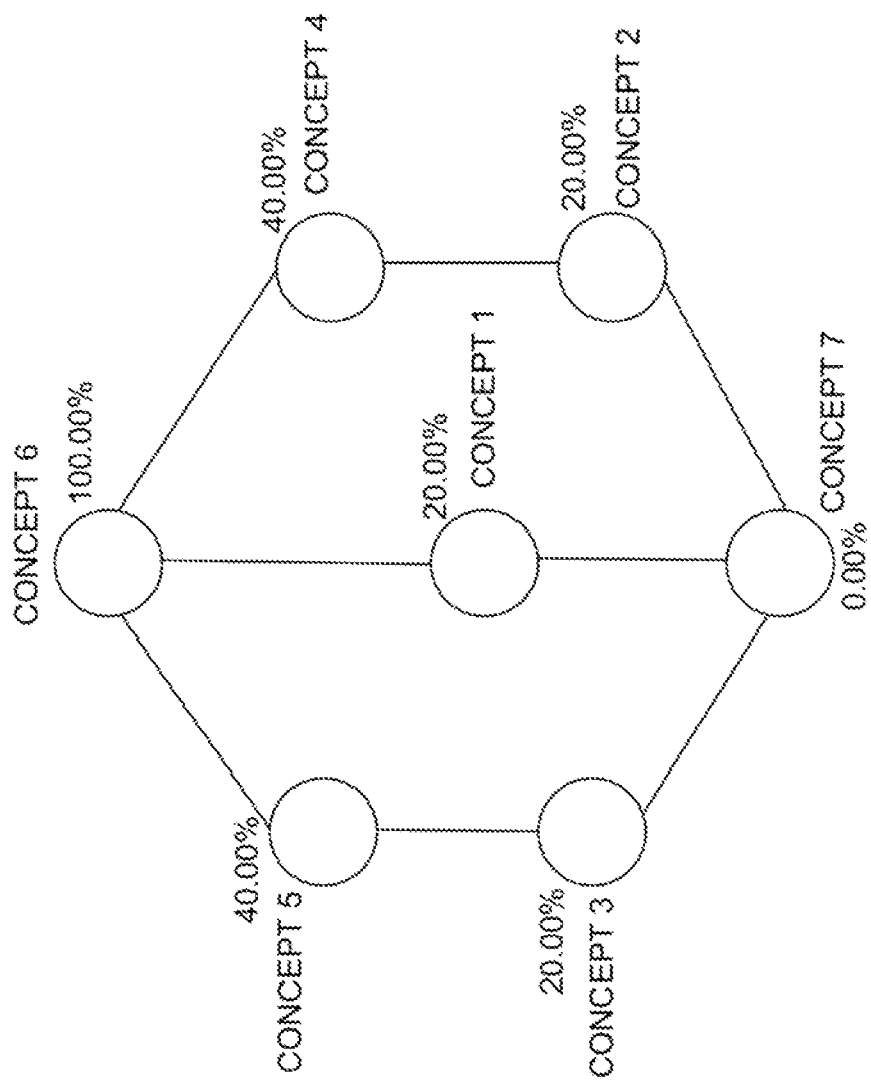
FIG. 7 is a graphical representation that illustrates a lattice construction for the job description of FIG. 4 using the lattice construction module of FIG. 3 of the resume analyzer tool of FIG. 1 according to an embodiment herein.

FIG. 7 is a graphical representation that illustrates a lattice construction for the job description 402 of FIG. 4 using the lattice construction module 314 of FIG. 3 of the resume analyzer tool 106 of FIG. 1 according to an embodiment herein. The lattice construction module 314 forms various concepts with the extracted keywords and their associated categories. For example, the concept-1 to concept-7 associated with FIG. 7 are Concept-1: [Java Language]; [Computing Platforms, Computers, Java Platform, Computing]

Concept-2: [Java Coffee]: [Coffee, Beverages, Hot Beverages, Business, Coffee Varieties, Food Industry, Food and Drink Food Science, Industry]

Concept 3: [Plantation]: [Agriculture, Agricultural Establishments]

Concept-4: [Coffee, Java Coffee]: [Beverages, Hot Beverages, Business, Food Industry, Food and Drink, Food Science, Industry]

Concept-5: [Agriculture, Plantation]: [Agriculture]

Concept-6: [Coffee, Agriculture, Plantation, Java Language, Java Coffee]: [ ]

Concept-7: [ ]: [Agriculture, Coffee, Beverages, Business, Computers, Coffee Varieties, Java Platform, Food Science, Agricultural Establishments, Computing Platforms, Hot Beverages, Food Industry, Computing, Food and Drink, Industry]

In one embodiment, the lattice construction module 314 interprets that the Concept 1 "Java Language" has no association with any other concept or keyword, whereas, the concept 2 "Java Coffee" forms a concept with Coffee. Hence, the correct disambiguation is "Java Coffee".

The lattice construction module 314 computes the weight (shown in the percentage) for each node using the weighted FCA. A simple heuristic model of weighted FCA computes the weight of the nodes and the node with highest weight is used to disambiguate the keyword in the context of right meaning. For computing weight, the heuristic assigns equal probability for all the five keywords. Hence, there are totally 5 keywords having a weight of ⅕ each. The concept 1 to concept 7 defines a distinct category set for each keyword. Therefore, the weight for each keyword of concept 1 to concept 5 is ⅕ (20.00%).

In addition, the categories of "java coffee" are associated with the categories of "coffee" and both of them form the concept 4. Thus, the keywords "java coffee" and "coffee" are strongly associated in the context of given job description. The weight for the concept 4 will be 2*(⅕) (i.e., ⅖ is equal to 40,00%). Thus, the keyword "java" is treated as "java coffee" and not as "java language" by using weighted FCA. Similarly, each keyword in the resume 502 is disambiguated.

FIG. 8A through 8C is a user interface view of one or more resumes of one or more candidates stored in the database 302 of the resume analyzing and prioritizing tool 106 of FIG. 1 according to an embodiment herein. In particular, FIG. 8A is a user interface view of a first resume 802 of a first candidate according to an embodiment herein. FIG. 8B is a user interface view of a second resume 814 of a second candidate according to an embodiment herein. FIG. 8C is a user interface view of a third resume 824 of a third candidate according to an embodiment herein. The first resume 802 includes a first section 804 having a first event 806, and a second section 808 having (i) a second event 810, and (ii) a third event 812. For example, the first section 804 may include an education section. The first event 800 may include a degree (e.g., Certificate IV Agriculture) obtained by the candidate at a University (e.g., ABC University) in an Institute (e.g., X Institute of Technology). The first event 806 may further include (i) a duration (e.g., 2002 to 2006) that indicates the candidate has attended/completed the degree in the Institute, and (ii) a score that indicates an academic performance (e.g., CPA 4.7/5.0) obtained by the candidate during his/her tenure. Similarly, the second section 808 may include a work experience section that indicates an overall experience (e.g., a first date range—2006 till 2012 that indicates a second period—6 years). The second event 810 may include a duration (e.g., second date range 2006 to 2008 in Company A, and 2008 till 2012 in Company B), a period (e.g., a third period 2 years for Company A, and 4 years for Company B) the candidate worked for, and a job profile (e.g., Consulting in Java coffee and agriculture, including field techniques, processing and marketing in Company A). The third event 812 may include a duration (e.g., 2008 to 2012), a period, (e.g., the third period—4 years) for a company (e.g., a Company B) the candidate worked for, and a job profile (e.g., Refurbishing dilapidated coffee orchard).

At least one keyword (e.g., Java coffee) of the job description 402 is compared with at least one event (e.g., the education section and/or the work experience) in the first resume 802. Similarly, the first period (e.g., 5 years) of the job description 402 is compared with the third period (e.g., 2 years+4 years) in the first resume to obtain (a) a relevant event (e.g., the second event 810 and the third event 812) and (b) a relevant section (e.g., the second section 808) that is associated with the relevant event (e.g., the second event 810 and the third event 812). The third period is associated with (i) at least one keyword (e.g., Java coffee) present in the second event 810 (e.g., Consulting in Java coffee and agriculture, including field techniques, processing and marketing), and/or (ii) at least one keyword (e.g., coffee) present in the third event 812 (e.g., Refurbishing dilapidated coffee orchard).

A weight is computed for all the three resumes (e.g., the first resume 802, the second resume 814, and the third resume 824) based on an equation:

$$W=P1/(P2*(Y1-Y2)),$$

Y1 is not equal to Y2, where W the weight; P1=the third period, P2=the second period of the relevant section, Y1=a current year and Y2=a latest year. The latest year is a year of at least one end date of the second date range associated with the relevant event.

A first weight for the first resume 802 is computed based on (i) the third, period (e.g., 2 years+4 years), (ii) the second date range (e.g., 2006 to 2008 and 2008 till 2012) of the at least one event, and (iii) the second period (e.g., the overall experience—6 years) of the relevant section in accordance with an equation:

Weight for the first resume=third period/(second period*(current year−latest year))=6/[6*(2013−2012)]

Weight for the first resume=1.0.

The reason, for selecting the latest year as 2012 is because the first candidate has been working in coffee orchard. If the first candidate has not in coffee plantation/orchard from the year 2008 till 2012, then the resume analyzing and prioritizing tool 106 identifies the latest year as 2008.

The second resume 814 includes a first section 816 having a first event 818, and a second section 820 having a second event 822 and a third event 823. For example, the first section 816 may include an education section. The first event 818 may include a degree (e.g., Bachelor of Engineering in Tropical & Subtropical Agriculture) obtained by the candidate at a University (e.g., XYZ University) in an Institute (e.g., Y Institute of Technology). The first event 818 may further include (i) a duration (e.g., 2002 to 2006) that indicates the candidate has attended/completed the degree in the Institute, and (ii) a score that indicates an academic performance (e.g., CPA 3.5/5.0) obtained by the candidate during his/her tenure. Similarly, the second section 820 may include a work experience section. The second event 822 may include a duration (e.g., 2007 to 2009), a period (e.g., 2 years) for a company (e.g., a Company X) the candidate worked for, and a job profile (e.g. Coffee plantation). The third event 823 may include a duration (e.g., 2009 till 2012), a period (e.g., 3 years) for a company (e.g., a Company Y) the candidate worked for, a job profile (e.g., Tea plantation).

As the first weight is computed, similarly, a second weight for the second resume 814 of the second candidate is computed based on (i) the third period (e.g., 2 years+3 years), (ii) the second date range (e.g., 2007 to 2009) of the at least one event (e.g., the second event 822), and (iii) the second period (e.g., the overall experience−5 years) of the relevant section in accordance with an equation:

Weight for the second resume=third period/(second period*(current year−latest year))=2/[5*(2013−2009)]

Weight for the first resume=0.1.

The reason that the resume analyzing and prioritising tool 106 considers the third period to compute the weight as only 2 years because the second candidate has relevant work experience (e.g., 2 years in coffee plantation) that is likely to be related to Java Coffee plantation.

The third resume 824 includes a first section 820 having a first event 828, and a second section 830 having (i) a second event 832, and (ii) a third event 834. For example, the first section 820 may include an education section. The first event 828 may include a degree (e.g., Bachelor of Science Degree, General Tropical Agriculture) obtained by the candidate at a University (e.g., XYZ University) in an Institute (e.g., Y Institute of Technology). The first event 828 may further include (i) a duration (e.g., 2000 to 2004) that indicates the candidate has attended/completed the degree in the Institute, and (ii) a score that indicates an academic performance (e.g., CPA 4.0/5.0) obtained by the candidate during his/her tenure. Similarly, the second section 830 may include a work experience section. The second event 832 may include a duration (e.g., 2004 to 2010), a period (e.g., 6 years) for a company (e.g., a Company B) the candidate worked for, and a job profile (e.g., Combining estate coffee growing and processing and marketing into a successfully branded product line). The third event 834 may include a duration (e.g., 2010 to 2012), a period (e.g., 2 years) for a company (e.g., a Company C) the candidate worked for, and a job profile (e.g., Milk Production).

As the first weight and the second weight are computed, similarly, a third weight for the third resume 824 of the third candidate is computed based on (i) the third period (e.g., 6 years+2 years), (ii) the second date range (e.g., 2004 to 2010 and 2010 till 2012) of the at least one event (e.g., the second event 832 and the third event 834), and (iii) the second period (e.g., the overall experience−8 years) of the relevant section in accordance with an equation:

Weight for the third resume=third period/(second period*(current year−latest year))=6/[8*(2013−2010)]

Weight for the third resume=0.25

The reason that the resume analyzing and prioritizing tool 106 (i) considers the third period, to compute the weight as only 6 years because the third candidate has relevant work experience (e.g., 6 years in coffee growing and processing) that is likely to be related, to Java Coffee plantation, and (ii) does not consider the remaining 2 years of experience in Milk production as it is not related to coffee plantation.

Therefore, based on the first weight (1.0) for the first resume 802, the second weight (0.1) for the second resume 814, and the third weight (0.25) for the third resume 824, the resume prioritization module 820 prioritizes the first resume 802, followed by the third resume 824, and followed by the second resume 814. The order of the prioritization may vary, in one example embodiment. For instance, the resume prioritization module 820 may prioritize first a resume that has a lowest weight, followed by a resume that has a lower weight, etc.

In a further example, where a job description includes "2 years of experience in Java language", and details for one or more resumes to be prioritized are:

1st Resume
Work experience—Overall—2 years
2 year experience in teaching Java (2010 to 2012)—Asst. prof or HOD (Comp Sci) at an
Engineering College
2nd Resume
Work experience—Overall—2 years
1 year experience (2010 to 2011)—Asst. prof (Comp Set Dept.) at an Engg. College
1 year experience (2011 to 2012)—Software engineer in Company A, skills Java
3rd Resume
Work experience—Overall 2 years
1 year experience in teaching Java (2010 to 2011)—Asst. prof (Comp Sci) at Engineering College
1 year experience (2011 to 2012)—Java Coaching classes to students at a private coaching institute, the weights for the resumes are computed as follows:
Weight for $1^{st}$ resume=2/[2*(2013−2012)]=1.0,
Weight for $2^{nd}$ resume is not computed, as the event is not considered. The reason for the event not being considered is a candidate associated with the $2^{nd}$ resume has only 1 year of experience in Java which does not match the job description (e.g., 2 years of experience in Java Language).
Weight for 3rd resume=(1+1)/[2*(2013−2012)]=1.0.
Therefore, the resume analyzing and prioritizing tool 106 prioritizes the $1^{st}$ resume and the $3^{rd}$ resume only.

Figure 9A:
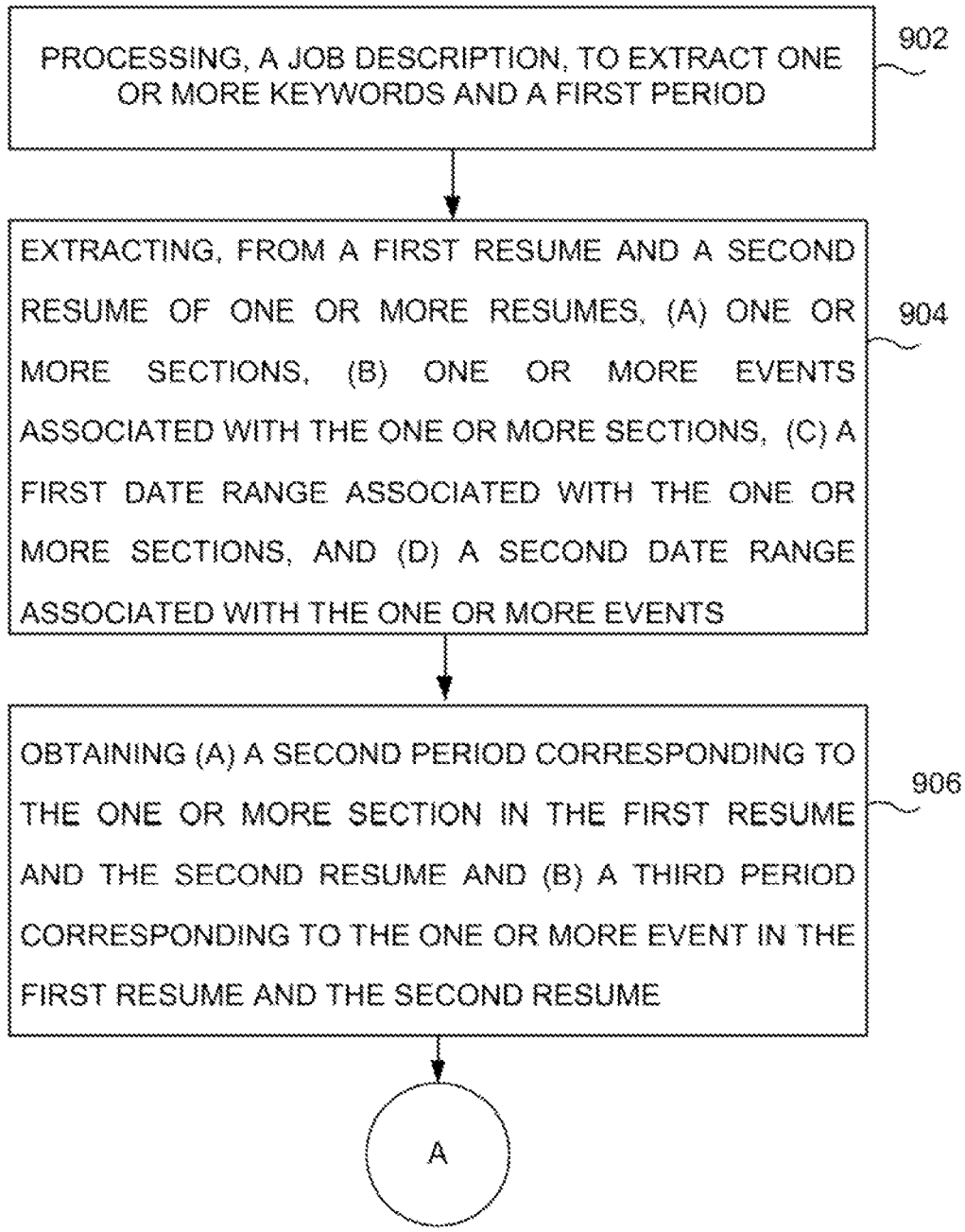
FIGS. 9A and 9B is a flow diagram illustrating a method for prioritizing one or more resumes based on a job description using the resume analyzing and prioritizing tool of a FIG. 1 according to an embodiment herein.
Figure 9B:
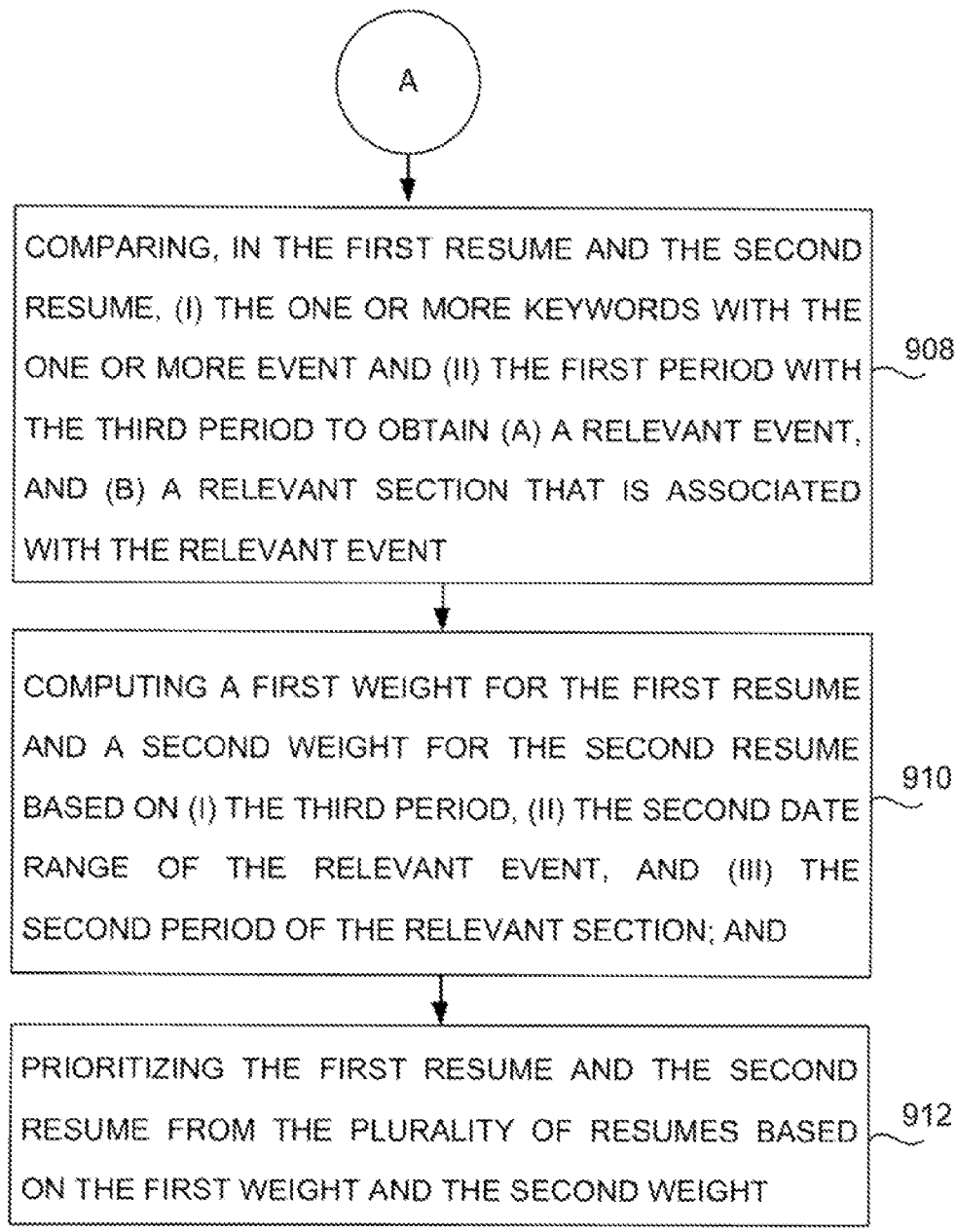

FIGS. 9A and 9B is a flow diagram, illustrating a method for prioritizing one or more resumes based on a job description using the resume analyzing and prioritizing tool 106 of a FIG. 1 according to an embodiment herein. In step 902, the job description is processed using the resume analyzing and prioritizing tool 106 to extract one or more keywords and a first period associated with the one or more keywords. In step 904, (a) one or more sections, (b) one or more events associated with the one or more sections, (c) a first date range corresponding to each of the one or more sections, and (d) a second date range corresponding to each of the one or more events are extracted from a first resume and a second resume of the one or more resumes. In step 906, (i) a second period corresponding to the one or more sections in the first resume and the second resume and (ii) a third period corresponding to the one or more events in the first resume and the second resume are obtained. In step 908, (a) the one or more keywords with the one or more events and (ii) the first period with the third period is compared in the first resume and the second resume to obtain (a) a relevant event, and (b) a relevant section that is associated with the relevant event. In step 910, a first weight for the first resume and the second weight for the second resume are computed based on (i) the third period, (ii) the second date range of the relevant event, and (iii) the second period of the relevant section. In step 912, the first resume and the second resume is prioritized based on the first weight and the second weight. The first date range and the second date range each include a start date and an end date. The start date and the end date may include a year, a date or a month.

In one embodiment, the second period may be obtained from the first date range and the third period is obtained from the second date range. The first weight and the second weight are computed in accordance with an equation:

$$W=P1/(P2*(Y1-Y2)),$$

wherein W=the weight; P1= the third period, P2= the second period of the relevant section, Y1= current year and Y2= a latest year. The latest year is the year of the end date of the second date range associated with the relevant event, and wherein Y1 is not equal to Y2. In another embodiment, job description may include a fourth period. The resume analysing and prioritizing tool 106 extracts the fourth period from the job description and compares the fourth period with the second period to obtain the relevant event and the relevant section.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system, for the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
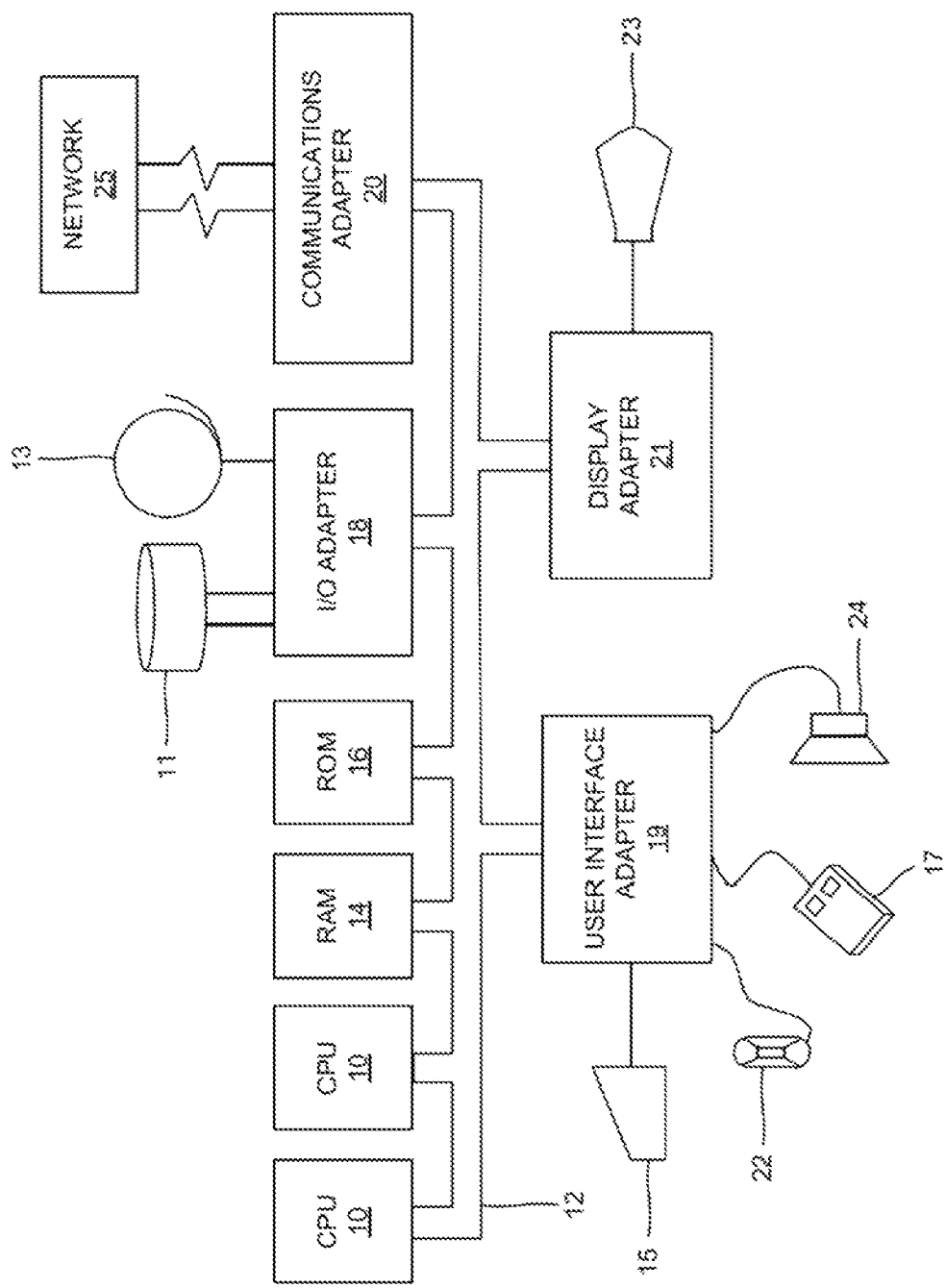
FIG. 10 illustrates a schematic diagram of a computer architecture used in accordance with the embodiments herein.

FIG. 10 illustrates a schematic diagram of a computer architecture used in accordance with the embodiments herein. The computer architecture includes one or more processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The computer architecture further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The resume analyzing and prioritising tool 106 prioritizes one or more resumes based on a weight, and a search query (e.g., the job description 402). The resume analyzing and prioritising tool 106 may also prioritize the one or more resumes based on only education section when there is no work experience mentioned in the one or more resumes. However, the resume analyzing and prioritizing tool 106 may consider relevant project work, an internship carried in an institution or in a company, or any other work carried out by a candidate for computing the weight and prioritizing the resume. When there are more than one keyword in the job description 402 and a combination of experience is specified (e.g., total of 6 years in Agriculture and Java coffee plantation), then the resume analyzing and prioritizing tool 106 may compute a weight for each keyword using the above formula, and a final weight is obtained using a geometric mean (e.g., $$G = \sqrt[n]{w1 * w2 \ldots * Wn}),$$

where w1, w2, ... wn are the weights identified corresponding to the keyword, matches, and G is an overall weight computed for the resume.

The foregoing description of the specific embodiments will so fully reveal the general nature of the embodiments herein that others can, by applying current knowledge, readily modify and/or adapt tor various applications such specific embodiments without departing from the generic concept, and, therefore, such adaptations and modifications should and are intended to be comprehended within the meaning and range of equivalents of the disclosed embodiments. It is to be understood that, the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for prioritizing a plurality of resumes based on a job description, comprising:
   processing said job description to extract at least one keyword and a first period;
   extracting, from a first resume and a second resume of said plurality resumes, (a) at least one section, (b) at least one event associated with said at least one section, (c) a first date range associated with said at least one section, and (d) a second date range associated with said at least one event;
   obtaining (a) a second period corresponding to said at least one section in said first resume and said second resume and (b) a third period corresponding to said at least one event in said first resume and said second resume;
   comparing, in said first resume and said second resume, (i) said at least one keyword with said at least one event and (ii) said first period with said third period to obtain (a) a relevant event, and (b) a relevant section that is associated with said relevant event;
   computing a first weight for said first resume and a second weight for said second resume based on (i) said third period, (ii) said second date range of said relevant event, and (ii) said second period of said relevant section; and
   prioritizing said first resume and said second resume from said plurality of resumes based on said first weight and said second weight, wherein said first date range and said second date range each comprise a start date and an end date.

2. The method of claim 1, wherein (i) said second period is obtained based on said first date range and (ii) said third period is obtained based on said second date range.

3. The method of claim 1, wherein said start date and said end date comprises a year, a date or a month.

4. The method of claim 3, wherein said first weight and said second weight are computed in accordance with an equation:

$$W = P1/(P2*(Y1-Y2)),$$

wherein W=said weight, P1=said third period, P2=said second period of said relevant section, Y1=a current year and Y2=a latest year.

5. The method of claim 4, wherein said latest year is said year of said end date of said second date range associated with said relevant event, and wherein Y1 is not equal to Y2.

6. The method of claim 1, further comprising:
   processing said job description to extract a fourth period; and
   comparing, said first resume and said second resume, (i) said at least one keyword with said at least one event, (ii) said fourth period to said second period, and (iii) said first period with said third period to obtain (a) said relevant event from said at least one event and (b) said relevant section that is associated with said relevant event.

7. A system for prioritizing a plurality of resume based on said job description, said system comprising:
   a memory unit that stores a database and a set of modules, wherein said database stores said plurality of resumes;
   a display unit; and
   a processor that executes said set of modules, wherein said set of modules comprises:
   an extracting module that
   (i) extracts, from said job description, at least one keyword and a first period; and
   (ii) extracts, from a first resume and a second resume of said plurality resumes, (a) at least one section, (b) at least one event associated with said at least one section, (c) a first date range associated with said at least one section and (d) a second date range associated with said at least one event;
   a comparison module that compares, in said first resume and said second resume, (i) said at least one keyword with said at least one event and (ii) said first period with a third period associated with said at least one event to obtain (a) a relevant event from said at least one event and (b) a relevant section that is associated with said relevant event;
   a weight computing module that computes a first weight for said first resume and a second weight for said second resume based on (i) said third period, (ii) said second date range of said relevant event and (ii) a second period that corresponds to said relevant section; and a prioritizing module that prioritizes said first resume and said second resume from said plurality of resumes based on said first weight and said second weight, wherein said first date range, and said second date range comprises a start date and an end date.

8. The system of claim 7, wherein said set of modules further comprises:

a period computing module that computes (i) said second period based on said first date range and (ii) said third period based on said second date range.

9. The system of claim 7, wherein said start date and said end date comprises a year, a date or a month.

10. A non-transitory program storage device readable by computer, and comprising a program of instructions executable by said computer to perform a method for prioritizing a plurality of resumes based on a job description, said method comprising:

processing said job description to extract at least one keyword and a first period;

extracting, from a first resume and a second resume of said plurality resumes, (a) at least one section, (b) at least one event associated with said at least one section, (c) a first date range associated with said at least one section, and (d) a second date range associated with said at least one event;

obtaining, (a) a second period corresponding to said at least one section in said first resume and said second resume and (b) a third period corresponding to said at least one event in said first resume and said second resume;

comparing, in said first resume and said second resume, (i) said at least one keyword with said at least one event and (ii) said first period with said third period to obtain (a) a relevant event, and (b) a relevant section that is associated with said relevant event;

computing a first weight for said first resume and a second weight for said second resume based on (i) said third period, (ii) said second date range of said relevant event, and (iii) said second period of said relevant section; and prioritizing said first resume and said second resume front said plurality of resumes based on said first weight and said second weight, wherein said first date range and said second date range each comprise a start date and an end date.

11. The non-transitory program storage device of claim 10, wherein (i) said second period is obtained based on said second range date and (ii) said third period is obtained based on said third data range.

12. The non-transitory program storage device of claim 10, wherein said start date and said end date comprises a year, a date or a month.

13. The non-transitory program storage device of claim 12, wherein said first weight and said second weight are calculated in accordance with an equation:

$$W=P1/(P2*(Y1-Y2)),$$

wherein W=said weight, P1=said third period, P2=said second period of said relevant section, Y1=current year and Y2=latest year.

14. The non-transitory program storage device of claim 13, wherein said latest year is said year of said end date of said second date range associated with said relevant event and Y1 is not equal to Y2.

15. The non-transitory program storage device of claim 14, wherein said method further comprises:

processing said job description to extract a fourth period; and comparing, said first resume and said second resume, (i) said at least one keyword with said at least one event, (ii) said fourth period to said second period, and (iii) said first period with said third period to obtain (a) said relevant event from said at least one event and (b) said relevant section that is associated with said relevant event.

* * * * *